United States Patent Office 2,910,522
Patented Oct. 27, 1959

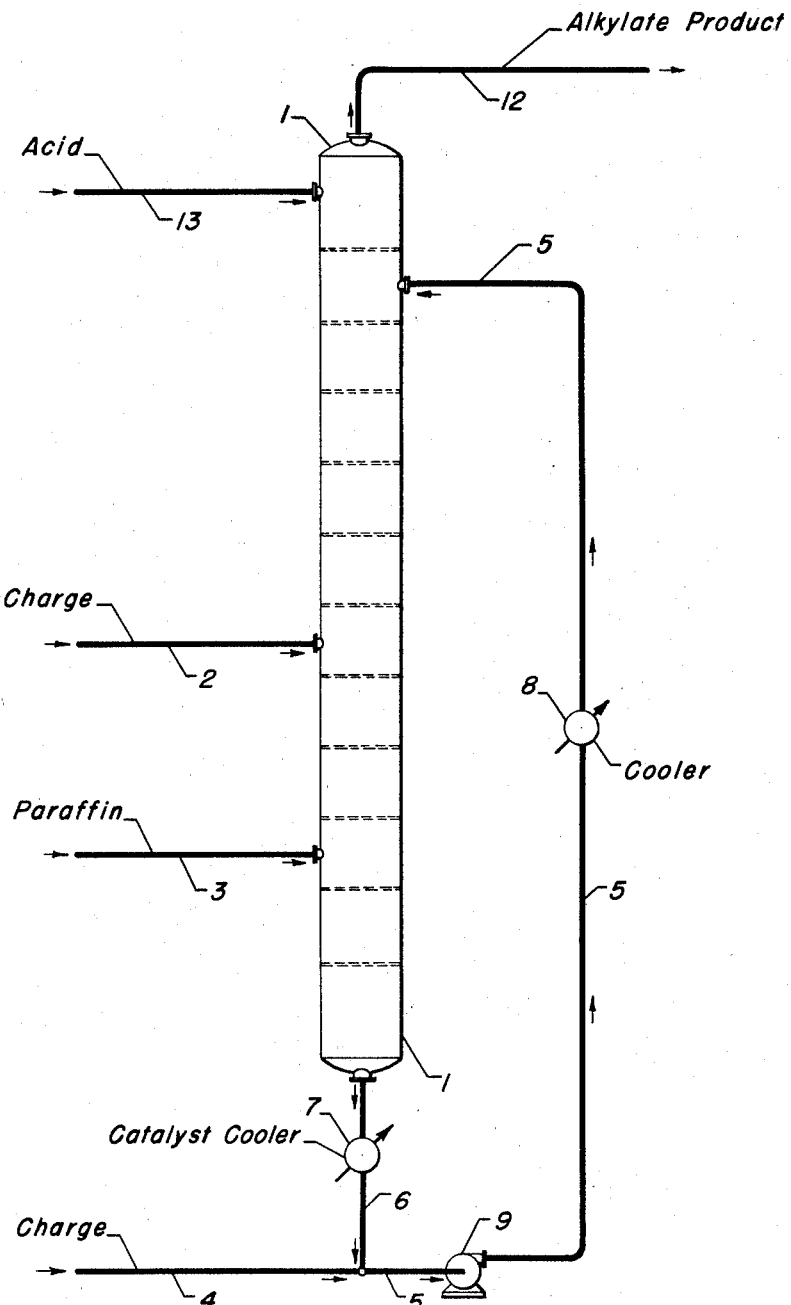

2,910,522

EXTRACTIVE ALKYLATION PROCESS

Clarence G. Gerhold, Palatine, and Robert E. Sutherland, Chicago, Ill., assignors, by mesne assignments, to Universal Oil Products Company, Des Plaines, Ill., a corporation of Delaware Application November 5, 1957, Serial No. 694,545

4 Claims. (Cl. 260—683.48)

This invention relates to a process for condensing hydrocarbons with olefin-acting substances and particularly relates to an acid catalyzed alkylation process effected under specific conditions to produce high yields of pure product.

Acid catalyzed alkylation is an extremely useful process especially for manufacturing normally liquid hydrocarbons from relatively less valuable normally gaseous hydrocarbons. The product from alkylation processes may be high boiling liquids such as alkyl aryl intermediates for detergent manufacture or hydrocarbons boiling in the gasoline range which have high octane rating, highly stable character and generally good motor fuel characteristics. The alkylation process usually comprises intimately commingling an alkylatable material such as a paraffinic material having a tertiary carbon atom and an olefin or olefin-acting substance so that the alkyl portion of the olefin-acting substance or the olefin itself combines with the alkylatable material. For example, an olefin may combine with an isoparaffin molecule at the tertiary carbon atom to produce a higher molecular weight isoparaffinic molecule. Typical paraffinic charge materials may include isobutane or higher homologs of isobutane which contain tertiary carbon atoms, for example, 2-methylbutane, 2-methylpentane, 2,4-dimethylpentane, etc. Other alkylatable materials may include benzene, toluene, xylene, phenols, cresols, amines, thiophenes, isoparaffinic mercaptans and any other of the alkylatable materials known to the art. The olefin-acting substance, as heretofore stated, may consist of an olefin or a substituted alkyl compound.

Typical olefins which may be used include propylene, butylene, pentene, isopentene and homologs thereof. Other olefin-acting substances include propyl chloride, butyl chloride, pentyl chloride, isopentyl chloride, hexyl chloride, butyl bromide, as well as ethers, aldehydes, acids, alcohols, etc. The most frequently employed charge materials are isobutane and butylene which react to form a paraffinic alkylate containing 8 carbon atoms, however, it is not intended to limit the process of this invention to any particular feed stock.

As heretofore stated, the reaction is effected in the presence of an acid catalyst, or more specifically, a mineral acid catalyst. The catalysts employed usually are hydrogen fluoride and sulfuric acid. The alkylation reaction in the presence of a suitable acid catalyst is easily effected at ordinary temperatures and with reasonably intimate contact of sufficient duration, the olefin-acting portion of the feed, if not too abundant, is completely consumed.

There are many problems associated with the process of alkylation. The olefin-acting material must be limited in concentration to prevent the reaction of olefin-acting substance with more olefin-acting material because of the high activity of the material in the reaction mixture. Also, because of the high activity, there is a tendency to form high molecular weight materials by alkylating and polymerizing many molecules of hydrocarbon instead of just one. Since the process is effected by intimately contacting acid with hydrocarbon and the products are recovered by fractionation of the reaction mixture, the occurrence of higher molecular weight products produces a situation where they, because of their high boiling point, will appear in the higher boiling acid fraction of the reaction mixture. There is accordingly a tendency for this undesirable material to accumulate in the system rather than to be removed with the product and the longer it remains in the system the heavier and more detrimental it becomes. These materials eventually become what is known as sludge and in order to keep sludge formation under control, it is necessary to employ an additional fractionation process to separate acid catalyst from heavy hydrocarbon or to continuously discard spent catalyst and add fresh catalyst.

Another difficulty associated with alkylation processes is the formation of substituted alkane compounds which may be stable compounds or unstable intermediate products but which none-the-less appear in the product stream. These materials, such as alkyl fluorides, must be kept out of the product primarily because they are undesirable components of gasoline and secondarily because they represent a loss in catalyst. Even though the loss in catalyst could be tolerated, it is necessary to effect expensive treatment processes on the product to remove substituted alkanes from it in order to obtain a pure product.

The alkylation process is an exothermic process and a low temperature process and therefore it requires continuous heat removal from the reaction zone. Removing heat homogeneously to avoid local high temperatures is another difficulty associated with alkylation processes.

It is one object of this invention to provide an extractive alkylation process which selectively rejects alkylate from the reaction zone by concurrently effecting the alkylation reaction with an extraction process thereby passing high molecular weight hydrocarbons from the reaction zone in the product stream. This method not only removes higher molecular weight hydrocarbons from the catalyst phase without a special separation process but it also prevents high molecular weight hydrocarbons from circulating and thereby prevents the formation of sludge by limiting the time that the material is in contact with catalyst at reaction conditions. It is another object of this invention to provide an extractive alkylation process which selectively retains substituted alkanes such as alkyl fluoride and alkyl sulfate in the reaction zone until they react with alkylatable material to form hydrocarbon thereby preventing the loss of catalyst in the product stream and more important, preventing the necessity for effecting a subsequent purification process on the product stream. It is still another object of this invention to provide a process flow which maintains proper reaction temperature by means of indirect and direct cooling.

In one embodiment, this invention relates to a process for condensing an alkylatable material with an olefin-acting compound which comprises passing a mixture containing said alkylatable material and said olefin-acting compound into a multi-stage contacting vessel at an intermediate point, introducing acid catalyst into the upper portion of said vessel, introducing alkylatable material into said vessel below said intermediate point, withdrawing acid catalyst from the bottom of said vessel and passing it through cooling means into the upper part of said vessel as said acid catalyst and recovering a resultant condensation product from the top of said vessel.

The operation and advantages of the process of this invention may be best described with reference to the accompanying drawing which shows schematically the essential features of the process and some variations of it which are within its scope. For the sake of convenience and clarity, the drawing will be described in relation to the process for alkylating isobutane with butylene, however, it is not intended thereby to limit the invention to this particular species of alkylatable material, olefin-acting substance or acid catalyst.

In the drawing, vessel 1 is a multi-stage contacting vessel which may consist of a packed column or a column containing a series of decks containing bubble caps, perforations or other means of dispersing one phase in another in subdivided form with each stage having conduit means connecting to each adjacent stage. Since hydrogen fluoride, the mineral acid catalyst employed, is aqueous and the reactants and reaction product are hydrocarbonaceous, phase separation will be experienced in contacting each stage or throughout a packed column which is the equivalent of stages. Charge is introduced in at least two places. One charge stream is introduced through line 2 into an intermediate portion of column 1 and it will contain isobutane and butylene and may also contain limited quantities of normal butane or other inert diluents. The charge passing through line 2 is contacted within column 1 with a descending acid catalyst stream introduced through line 5 and either the acid phase or the hydrocarbon phase is in finely divided form to produce intimate contact. Multi-stage contacting columns can be designed to function with either the light phase or the heavy phase discontinuous and both operations are within the scope of this invention. The temperature of the charge and the acid catalyst are adjusted so that the intermediate portion of column 1 is at a temperature suitable for the reaction and as a result the olefin-acting substance, butylene, condenses with the isoparaffin to form a branched chain, eight carbon-atom molecule. It is preferred to operate with a large excess of acid and this is readily accomplished in the process of this invention without a large catalyst inventory merely by increasing the circulation rate of the catalyst through column 1.

Charge is also introduced through line 3 and the charge passing through line 3 is preferably isoparaffin, however, it may also contain olefin or normal paraffin. Since butylene is extremely soluble in the acid phase while isobutane is not, the acid phase below the feed point of line 2 will contain dissolved butylene, however, the contact of the descending acid phase with a rising paraffin-rich stream from line 3 will cause the acid to be stripped of butylene both by the consumption of it in reacting with paraffin and the displacement of it by contacting a disproportionately large quantity of rising paraffin.

In the reaction zone, various compounds and reaction intermediates may be formed other than the desired product. For example, two molecules of olefin may polymerize and then react with isobutane to form a heavier than desired molecule or the mineral acid may react with olefin to form a substituted alkane, i.e. alkyl fluoride. The substituted alkane is more soluble in the acid phase than in the hydrocarbon phase and will, therefore, be extracted from the rising hydrocarbon stream in the upper portion of column 1 by the descending acid phase so that it cannot escape with the product that discharges from the top of column 1 through line 12. Conversely, the heavier hydrocarbon material is more soluble in the hydrocarbon phase than in the acid phase and it will be stripped from the descending acid stream by the rising hydrocarbon stream and passed overhead through line 12. As a consequence, the alkylate product stream passing through line 12 is substantially free of substituted alkanes which were extracted in the descending acid while the descending acid phase is substantially free of high molecular weight hydrocarbons which were stripped by the rising hydrocarbon phase. Furthermore, the acid stream passing from the bottom of column 1 is substantially free of olefin-acting compound which was removed both by reacting with paraffin and by being stripped from the acid phase by the paraffin. The clean acid removed from the bottom of column 1 through line 6 is cooled with coolers 7 and 8 and pumped with pump 9 through line 5 back to the top of column 1 to repeat the cycle.

When it is desired to distribute the reaction so that a portion of it does not take place within column 1 some of the charge may be introduced through line 4 and commingled with the circulating acid stream in line 5. The material reacted in line 5 may be cooled in cooler 8 to a suitable temperature for use in column 1, that is below 130° F. and preferably below 90° F. Although the use of the transfer line as a reactor will aid in maintaining the reaction temperature at the proper level, it will to some extent disrupt the ability of the acid stream to extract all of the substituted alkanes from the product however this may be remedied by introducing a small quantity of acid into a higher point in the column than where line 5 enters. For example, line 13 may be employed to introduce a small quantity of acid to the system which may be fresh make-up acid or which may be some acid passed from line 6 which passes from the bottom of column 1. The use of this additional acid stream will insure the extraction of substituted alkanes from the alkylate product stream even when hydrocarbon is introduced into line 5.

The alkylation of isobutane with butylene when employing a hydrogen fluoride catalyst is effected at temperatures less than 130° F. and preferably at temperatures less than 90° F. Generally speaking, a more desirable product distribution will be obtained when the process is effected from about 50° F. to about 70° F., however, the source of cooling fluid frequently limits the operating conditions. When using sulfuric acid catalyst to promote the alkylation of benzene with propylene tetramer to form a sulfonatable intermediate for detergent manufacture, the reactants are contacted at a temperature of from about 0° F. to about 55° F. to obtain the best product.

The charge to the process may contain inert diluents which are usually present because they are difficult to separate. For example normal paraffin in limited amounts may be present in an isoparaffin feed stock without detrimental action. It is preferred to maintain relatively small amounts of olefin-acting material in the reaction mixture to prevent its polymerization and resultant undesirable high molecular weight olefinic product. The reaction is usually effected at superatmospheric pressure, however, high pressures are not necessary and pressures in the range of from about 50 to about 150 p.s.i. are usually used.

As a specific example of the process of the present invention, an aqueous HF catalyst is employed by being circulated downward through reaction vessel 1 and returned to the top by line 5. The charge entering line 2 consists of 55% isobutane, 25% normal butane and the remainder butylene. This charge is introduced into column 1 and encounters a rising stream of isobutane from line 3 and a descending stream of acid catalyst from line 5 to cause a reaction mixture in the middle of column 1 containing approximately 62% isobutane, 20% normal butane and 18% butylene. An alkylate product stream consisting of isobutane, normal butane, $C_8$ alkylate and a small quantity of heavier materials is recovered through line 12. This material may be fractionated and the butane portion at least partly returned to the process as charge. The alkylate product stream is substantially free of alkyl fluoride and the circulating acid stream may be used for long periods of time with small sludge formation. The temperature of the charge and the temperature of the circulating acid stream are maintained to keep the reaction temperature at about 90° F.

The foregoing description illustrates that the process of this invention combines an extraction process with a condensation process to obtain advantages not obtainable by the use of each separately. In the combined process the aqueous mineral acid acts in the dual capacity of a catalyst and a solvent and performs the functions of cleaning the product as it promotes the reaction. The charge stock similarly acts in a dual capacity by performing the functions of providing reactable material and cleaning the catalyst of sludge-forming components. The combined process accordingly functions to produce a clean product in a sludge-free operation.

We claim as our invention:

1. A process for condensing an alkylatable material with an olefin-acting organic compound which comprises passing a mixture containing a portion of said alkylatable material and said olefin-acting compound into a vertical multi-stage contacting vessel at an intermediate point in the height thereof, introducing acid catalyst into an upper portion of and passing the same downwardly through said vessel, introducing another portion of said alkylatable material into said vessel below said intermediate point, countercurrently contacting the catalyst and reactants at alkylating conditions in said vessel, withdrawing acid catalyst from the bottom of said vessel and cooling and returning the same to the upper part of said vessel and recovering a resultant condensation product from the top of said vessel.

2. A process for condensing isobutane and butylene which comprises passing a mixture comprising a portion of said isobutane and butylene at a temperature below 90° F. into a vertical multi-stage contacting vessel at an intermediate point in the height thereof, introducing HF into an upper portion of said vessel at a temperature below 90° F., and passing the same downwardly through the vessel, introducing another portion of said isobutane into said vessel below said intermediate point at a temperature less than 90° F., countercurrently contacting the HF and hydrocarbons at alkylating conditions in said vessel, withdrawing HF from the bottom of said vessel and cooling and returning the same to the upper portion of said vessel and recovering a resultant condensation product from the top of said vessel.

3. The process of claim 1 further characterized in that additional alkylatable material and olefin-acting organic compound are commingled with the acid catalyst withdrawn from the bottom of said vessel.

4. A process for the alkylation of an isoparaffinic material which comprises introducing a portion of said material and an olefin to a vertical multi-stage contacting vessel at an intermediate point in the height thereof, introducing acid alkylation catalyst to an upper portion of and passing the same downwardly through said vessel, introducing another portion of said isoparaffinic material to the vessel below said intermediate point, reacting the isoparaffinic material with the olefin while in countercurrent contact with the descending catalyst in the contacting vessel, withdrawing catalyst from the bottom of the vessel and cooling and returning the same to the upper portion of the vessel, and removing alkylated isoparaffinic material from the top of said vessel.

References Cited in the file of this patent

UNITED STATES PATENTS

| | | |
|---|---|---|
| 2,435,029 | Bradley | Jan. 27, 1948 |
| 2,520,391 | Findlay | Aug. 29, 1950 |
| 2,662,103 | Matuszak | Dec. 8, 1953 |